United States Patent
Chen et al.

(10) Patent No.: US 10,810,480 B2
(45) Date of Patent: Oct. 20, 2020

(54) ELECTRONIC TAG AND ELECTRONIC SYSTEM USING THE SAME

(71) Applicant: MICROELECTRONICS TECHNOLOGY, INC., Hsinchu (TW)

(72) Inventors: Chang-Chun Chen, Hsinchu (TW); Wei Huang Chen, Zhubei (TW); Tung-Hua Yang, Hsinchu (TW)

(73) Assignee: MICROELECTRONICS TECHNOLOGY, INC., Hsinchu (TW)

( * ) Notice: Subject to any disclaimer, the term of this patent is extended or adjusted under 35 U.S.C. 154(b) by 135 days.

(21) Appl. No.: 16/017,212

(22) Filed: Jun. 25, 2018

(65) Prior Publication Data

US 2019/0392281 A1  Dec. 26, 2019

(51) Int. Cl.
*G06K 19/06* (2006.01)
*G06K 19/077* (2006.01)

(52) U.S. Cl.
CPC ... *G06K 19/07773* (2013.01); *G06K 19/0772* (2013.01)

(58) Field of Classification Search
CPC ............ G06K 19/07749; G07F 7/1008; G06Q 20/341
USPC .......................................................... 235/492
See application file for complete search history.

(56) References Cited

U.S. PATENT DOCUMENTS

| | | | |
|---|---|---|---|
| 9,104,950 B2* | 8/2015 | Kato ................ | G06K 19/07749 |
| 2014/0073071 A1* | 3/2014 | Diorio ................ | G06K 19/0723 |
| | | | 438/26 |
| 2014/0144992 A1* | 5/2014 | Diorio ................ | G06K 7/10297 |
| | | | 235/488 |
| 2014/0203981 A1* | 7/2014 | Nakano ................. | H01Q 1/521 |
| | | | 343/749 |
| 2014/0247192 A1* | 9/2014 | Ikemoto ............. | G06K 7/10237 |
| | | | 343/788 |
| 2015/0069132 A1* | 3/2015 | Pueschner ........ | G06K 19/07747 |
| | | | 235/488 |
| 2019/0067219 A1* | 2/2019 | Lasiter ................ | H01Q 1/2283 |

* cited by examiner

*Primary Examiner* — Ahshik Kim
(74) *Attorney, Agent, or Firm* — Muncy, Geissler, Olds & Lowe, P.C.

(57) ABSTRACT

The present disclosure provides an electronic system including an electronic device and an electronic tag. The electronic device includes a printed circuit board. The electronic tag includes a substrate and an antenna, wherein the substrate is disposed at a height over the printed circuit board. The substrate has a first side and a second side, wherein the first side is opposite to the second side. The antenna has a first portion and a second portion, wherein the first portion is disposed on the first side, the second portion is to disposed on the second side, and the first portion is electrically coupled to the second portion via plated through holes.

23 Claims, 18 Drawing Sheets

11A

ELECTRONIC TAG AND ELECTRONIC SYSTEM USING THE SAME

TECHNICAL FIELD

The present disclosure relates to an electronic tag and an electronic system, and more particularly, to an electronic tag and an electronic system capable of extending the access distance to an external device.

DISCUSSION OF THE BACKGROUND

Radio frequency identification (RFID) tags and near-field communication (NFC) devices are often embedded in electronic devices for identifying and tracking the electronic devices. The RFID tags and NFC devices use electromagnetic waves in order to be automatically identified and tracked. Electronic devices generate electromagnetic waves when the electronic devices operate, however, and the electromagnetic waves from the electronic devices often cause electromagnetic interference, which reduces the access distance of the RFID tag and the NFC devices.

This Discussion of the Background section is for background information only. The statements in this Discussion of the Background are not an admission that the subject matter disclosed in this section constitutes a prior art to the present disclosure, and no part of this section may be used as an admission that any part of this application, including this Discussion of the Background section, constitutes prior art to the present disclosure.

SUMMARY

One aspect of the present disclosure provides an electronic tag. The electronic tag comprises a substrate and an antenna; the substrate has a first side and a second side, wherein the first side is opposite to the second side; the antenna has a first portion and a second portion, wherein the first portion is disposed on the first side, the second portion is disposed on the second side, and the first portion is electrically coupled to the second portion via plated through holes.

In some embodiments, the electronic tag further comprises a micro control unit (MCU), the MCU comprises a controller having a first pin and a second pin, the first pin is electrically connected to a first end of the antenna, and the second pin electrically connected to a second end of the antenna.

In some embodiments, the MCU further comprises a third pin and a fourth pin electrically connected to an $I^2C$ bus.

In some embodiments, the first portion includes a substantially trapezoid conductor having a tapered end, the first end is electrically connected to the tapered end, and the plated through holes are disposed at one end opposite to the tapered end.

In some embodiments, the second portion is substantially a rectangular conductor.

In some embodiments, the electronic tag further comprises an identification integrated circuit chip having a first pin and a second pin, wherein the first pin is electrically connected to a first end of the antenna, and the second pin electrically connected to a second end of the antenna.

Another aspect of the present disclosure provides an electronic system comprises an electronic device and an electronic tag. The electronic device comprises a printed circuit board. The electronic tag comprises a substrate and an antenna, wherein the substrate is disposed at a height over the printed circuit board; the substrate has a first side and a second side, wherein the first side is opposite to the second side; the antenna has a first portion and a second portion, wherein the first portion is disposed on the first side, the second portion is disposed on the second side, and the first portion is electrically coupled to the second portion via plated through holes.

In some embodiments, the first portion includes a substantially trapezoid conductor having a tapered end, the first end is electrically connected to the tapered end, and the plated through holes are disposed at one end opposite to the tapered end.

In some embodiments, the second portion is substantially a rectangular conductor.

In some embodiments, the electronic tag comprises a micro control unit (MCU), the MCU comprises a controller having a first pin and a second pin, the first pin is electrically connected to a first end of the antenna, and the second pin electrically connected to a second end of the antenna.

In some embodiments, the MCU further comprises a third pin and a fourth pin electrically connected to an $I^2C$ bus.

In some embodiments, the electronic tag comprises an identification integrated circuit chip having a first pin and a second pin, wherein the first pin is electrically connected to a first end of the antenna, and the second pin electrically connected to a second end of the antenna.

In some embodiments, the antenna is a loop antenna.

In some embodiments, the electronic tag is a radio frequency identification (RFID) tag.

In some embodiments, the electronic tag is a near-field communication (NFC) device.

In some embodiments, the electronic tag further comprises a micro control unit (MCU) having a memory and a first interface.

In some embodiments, the electronic device comprises a controller and a second interface, wherein the controller accesses the memory via the first interface and the second interface.

In some embodiments, the electronic system further comprises a housing having an inner side facing the printed circuit board, and the electronic tag is affixed on the inner side.

In some embodiments, the printed circuit board does not include an identification integrated circuit chip.

In some embodiments, the identification integrated circuit chip is not electrically connected to the printed circuit board.

Another aspect of the present disclosure provides an electronic system comprising a device and an electronic tag. The device has a housing, and the electronic tag is affixed on the housing. The electronic tag affixed on comprises a substrate having a first side and a second side, wherein the first side is opposite to the second side; an antenna having a first portion and a second portion, wherein the first portion is disposed on the first side, the second portion is disposed on the second side, and the first portion is electrically coupled to the second portion via plated through holes; and an identification integrated circuit chip having a first pin and a second pin, wherein the first pin is electrically connected to a first end of the antenna, and the second pin electrically connected to a second end of the antenna.

In some embodiments, the identification integrated circuit chip further comprises a third pin and a fourth pin electrically connected to an I2C bus.

In some embodiments, the first portion includes a substantially trapezoid conductor having a tapered end, the first end is electrically connected to the tapered end, and the plated through holes are disposed at one end opposite to the tapered end.

In some embodiments, the second portion is substantially a rectangular conductor.

In some embodiments, the electronic system further comprises a reflector disposed below the second side.

With the electronic system of the present disclosure, when the substrate holding the antenna is disposed at the first height over the printed circuit board of the electronic device, the printed circuit board of the electronic device is used as a reflector for the RFID tag to reflect electromagnetic radiation transmitted from the antenna of the RFID tag. Therefore, the electromagnetic radiation is concentrated above the RFID tag, thereby extending the access distance of the RFID tag.

In contrast, with an existing electronic device, an existing RFID tag is disposed on a printed circuit board of the electronic device without any mechanism capable of effectively extending the access distance.

The cost for preparing the printed circuit board for transmitting and receiving wireless signals such as microwave signal is very expensive. In some embodiments, the electronic tag affixed on the housing can conserve the space of the printed circuit board and simplify the layout of the printed circuit board; in other words, the printed circuit board does not includes an identification integrated circuit chip such as the RFID chip. Consequently, the cost for preparing the printed circuit board can be dramatically decreased.

In addition, the design and preparation of the printed circuit board without the identification integrated circuit chip is much simpler than that of the printed circuit board with the identification integrated circuit chip. In practice, the printed circuit board of the electronic device can be designed and prepared independent of the identification integrated circuit chip, i.e., without a space for the identification integrated circuit chip; subsequently, the electronic tag carrying the MCU (the identification integrated circuit chip) can be prepared and affixed to the inner side of the housing, for identifying and tracking the electronic device.

Furthermore, some non-electronic devices do not have a printed circuit board, and it is inherently not possible to implement an electronic tag in the non-electronic devices for identifying and tracking the non-electronic devices. In practice, the electronic tag carrying the MCU (the identification integrated circuit chip) can be prepared and affixed to the inner side of the housing of the non-electronic devices, so as to implement the identifying and tracking of the non-electronic devices.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims. The disclosure should also be understood to be connected to the figures' reference numbers, which refer to similar elements throughout the description.

DETAILED DESCRIPTION

Figure 1A:
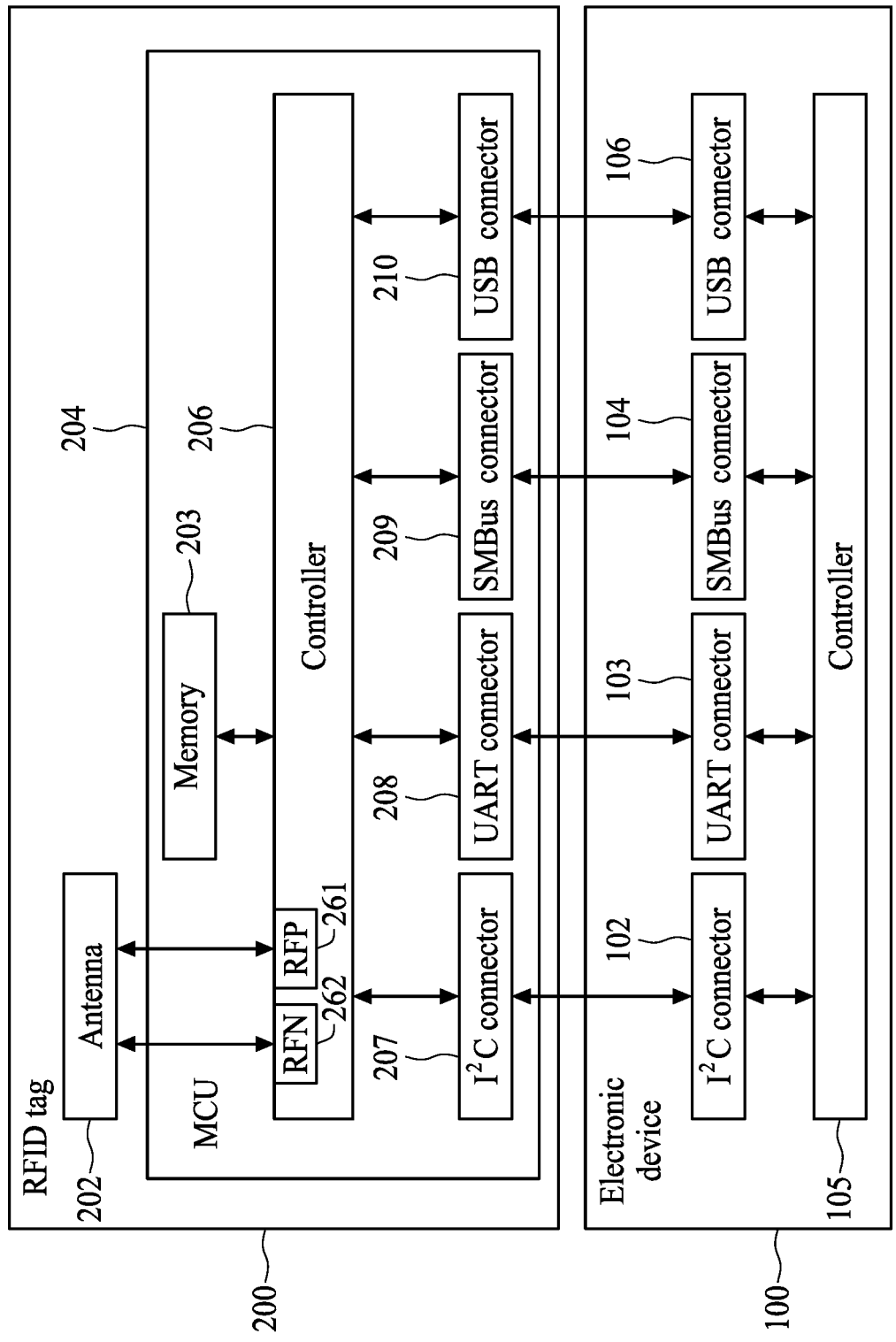
FIG. 1A is a schematic diagram of an electronic system including an electronic device and an electronic tag, in accordance with some embodiments of the present disclosure.

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral.

It shall be understood that, although the terms first, second, third, etc. may be used herein to describe various elements, or components, these elements or components are not limited by these terms. Rather, these terms are merely used to distinguish one element or component from another element or component. Thus, a first element or component discussed below could be termed a second element or component without departing from the teachings of the present inventive concept.

The terminology used herein is for the purpose of describing particular example embodiments only and is not intended to be limited to the present inventive concept. As used herein, the singular forms "a," "an" and "the" are intended to include the plural forms as well, unless the context clearly indicates otherwise. It shall be further understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

Aspects of the present disclosure may be implemented in methods or computer program products. Accordingly, the disclosure may be embodied in hardware and/or in hardware/software (including firmware). Furthermore, the present disclosure may take the form of a computer program product on a computer-usable or computer-readable storage medium having computer-usable or computer-readable program code embodied in the medium for use by or in connection with an instruction execution system. The actual software code or specialized control hardware used to implement embodiments described herein are not limiting of the disclosure. Thus, the operation of the aspects are described without reference to the specific software code, as it is understood that those skilled in the art will be able to design software and control hardware to implement the aspects based on the description herein. Furthermore, certain portions of the disclosure may be implemented as "logic" that performs one or more functions. This logic may include hardware, such as an application specific integrated circuit or field programmable gate array or a combination of hardware and software.

Radio frequency identification (RFID) uses electromagnetic waves to automatically identify and track electronic tags attached to objects. Therefore, an RFID tag is often interfered with by other electronic devices via the electromagnetic interference, thereby reducing an access distance of the RFID tag.

In addition to electromagnetic interference, a currently existing electronic device including an electronic tag suffers from other disadvantages, including the requirement to dispose the electronic tag on a printed circuit board of the currently existing electronic device. That is, the electronic tag needs to occupy space on the printed circuit board of the currently existing electronic device, and when designers design the layout of the currently existing electronic device, the designers need to prepare extra space on the printed circuit board to accommodate the electronic tag. Such design is not flexible and not universal, and causes increased cost to be incurred.

The present disclosure, in contrast, provides a design under which the electronic tag is not disposed on the printed circuit board of the electronic device. Therefore, the size of the printed circuit board of the electronic device of the present disclosure can be reduced. Another advantage is that when designers design the layout of the electronic device of the present disclosure, the designers do not need to prepare extra space on the printed circuit board to accommodate the electronic tag. Therefore, such design is flexible and universal, and costs are reduced.

FIG. 1A is a schematic diagram of an electronic system 11A including an electronic device 100 and an electronic tag 200 such as an RFID tag, in accordance with some embodiments of the present disclosure. Referring to FIG. 1A, in some embodiments, the electronic tag 200 includes an antenna 202 such as a loop antenna and a micro control unit (MCU) 204. In some embodiments, the MCU 204 is an identification integrated circuit chip having a first pin and a second pin for receiving and transmitting signals. In some embodiments, the MCU 204 includes a memory 203, a controller 206, an Inter-Integrated Circuit (I2C) connector 207, a Universal Asynchronous Receiver Transmitter (UART) connector 208, a System Management Bus (SMBus) connector 209, and a Universal Serial Bus (USB) connector 210.

In some embodiments, the I2C connector 207, the UART connector 208, the SMBus connector 209 and the USB connector 210 are configured for providing an interface through which the electronic device 100 can read data from the memory 203 or write data to the memory 203.

In some embodiments, the controller 206 includes two pins, RFN 262 and RFP 261 for receiving and transmitting RF signals, wherein the RFP 261 and the RFN 262 and the of the controller 206 are electrically coupled to the antenna 202 for RF signals processing. In some embodiments, the controller 206 is further electrically coupled to the memory 203, the I2C connector 207, the UART connector 208, the SMBus connector 209 and the USB connector 210.

In some embodiments, the memory 203 includes, but is not limited to, a Read-Only Memory (ROM), a Read-Write Memory, a Random Access Memory (RAM), an Electrically Erasable Programmable Read-Only Memory (EEPROM), or any non-volatile memory. In some embodiments, the data includes, but is not limited to, the serial number of the electronic device 100 and the manufacturing date of the electronic device 100.

In some embodiments, the controller 206 includes a system firmware. In some embodiments, the I2C connector 207, the UART connector 208, the SMBus connector 209 and the USB connector 210 are configured for providing an interface for updating the system firmware of the controller 206.

In some embodiments, the electronic device 100 includes an I2C connector 102, a UART connector 103, an SMBus connector 104, a controller 105 and a USB connector 106, for communicating with the electronic tag 200 via the I2C connector 207, the UART connector 208, the SMBus connector 209 and the USB connector 210.

In some embodiments, the I2C connector 102 is electrically coupled to the I2C connector 207, the UART connector 103 is electrically coupled to the UART connector 208, the SMBus connector 104 is electrically coupled to the SMBus connector 209, and the USB connector 106 is electrically coupled to the USB connector 210.

In some embodiments, the controller 105 communicates with the controller 206 for retrieving data from the memory 203 or writing data to the memory 203 via the I2C connector 102 and the I2C connector 207.

In some embodiments, the controller 105 communicates with the controller 206 for retrieving data from the memory 203 or writing data to the memory 203 via the UART connector 103 and the UART connector 208.

In some embodiments, the controller 105 communicates with the controller 206 for retrieving data from the memory 203 or writing data to the memory 203 via the SMBus connector 104 and the SMBus connector 209.

In some embodiments, the controller 105 communicates with the controller 206 for retrieving data from the memory 203 or writing data to the memory 203 via the USB connector 106 and the USB connector 210.

In some embodiments, the electronic device 100 is a thermal sensor, configured to monitor the temperature around the electronic device 100 and to periodically write a temperature data to the memory 203.

In some embodiments, the electronic device 100 is a humidity sensor, configured to monitor humidity around the electronic device 100 and to periodically write a humidity data to the memory 203.

In some embodiments, the electronic device 100 includes, but is not limited to, a network switch and a server.

In some embodiments, the controller 105 includes a system firmware. In some embodiments, the I2C connector 102, UART connector 103, SMBus connector 104 and USB connector 106 are configured to provide an interface for updating the electronic system firmware of the controller 105.

Figure 1B:
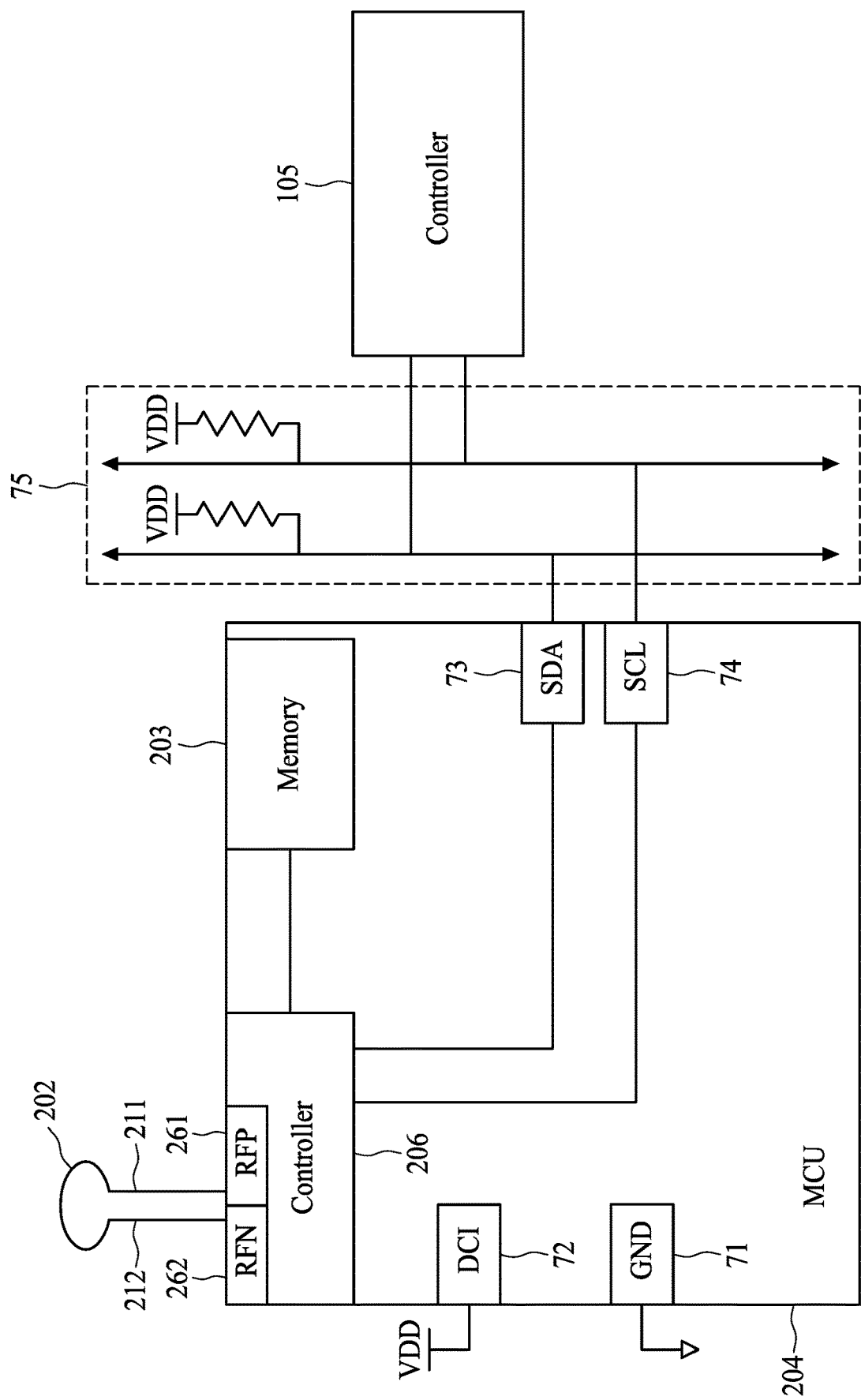
FIG. 1B is a schematic diagram showing the connection of an MCU of the electronic tag and a controller of the electronic device, in accordance with some embodiments of the present disclosure.

FIG. 1B is a schematic diagram of the MCU 204 and the controller 105, in accordance with some embodiments of the present disclosure. Referring to FIG. 1B, in some embodiments, the MCU 204 includes the memory 203, the controller 206, the antenna 202, pins GND 71, DCI 72, SDA 73 and SCL 74. In some embodiments, the pin GND 71 is electrically coupled to the ground, and the pin DCI 72 is electrically coupled to a power source VDD.

In some embodiments, the antenna 202 of the electronic tag 200 includes a first end 211 and a second end 212, the pin RFN 262 of the controller 206 is electrically coupled to the second end 212 of the antenna 202, and the pin RFP 261 of the controller 206 is electrically coupled to the first end 211 of the antenna 202 for transmitting and receiving RF signals.

In some embodiment, the pin SCL 74 is configured as a serial clock line for transmitting clock signal, and the pin SDL is configured as a serial data line for transmitting data. In some embodiments, the controller 105 of the electronic device 100 may optionally be electrically coupled to the SCL 74 and the SDA 73 via an I2C bus 75 for accessing the memory 203 of the MCU 204.

Figure 2:
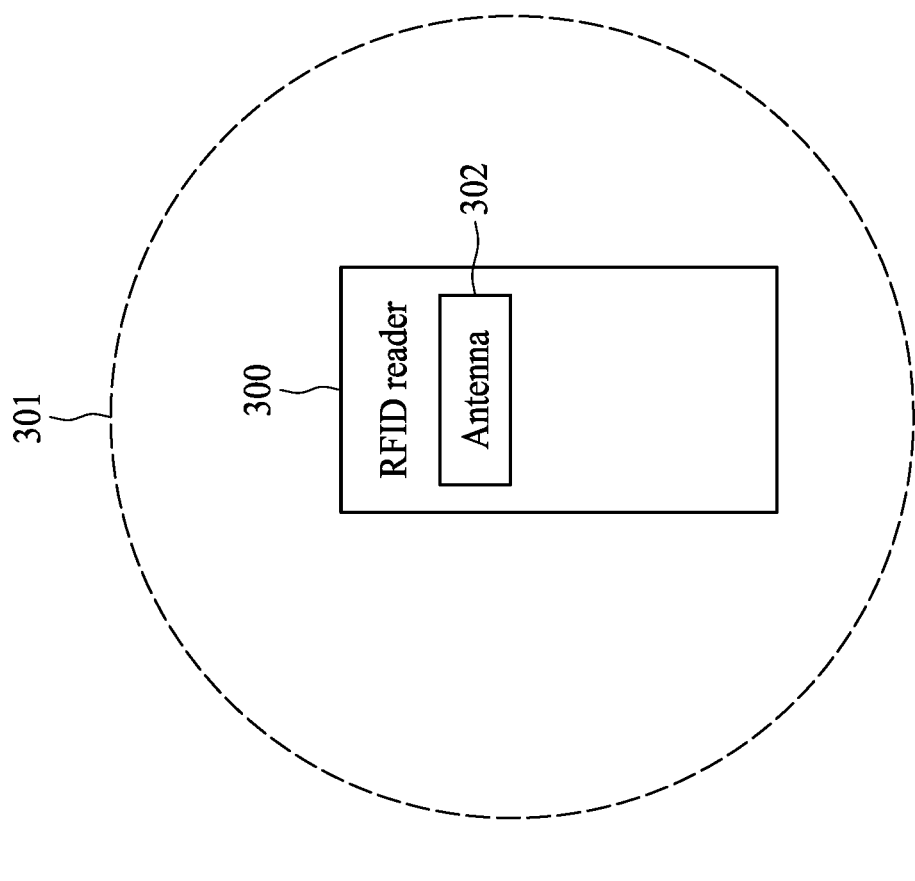
FIG. 2 and FIG. 3 are schematic diagrams showing the interaction between an RFID reader and the electronic tag, in accordance with some embodiments of the present disclosure.
Figure 3:
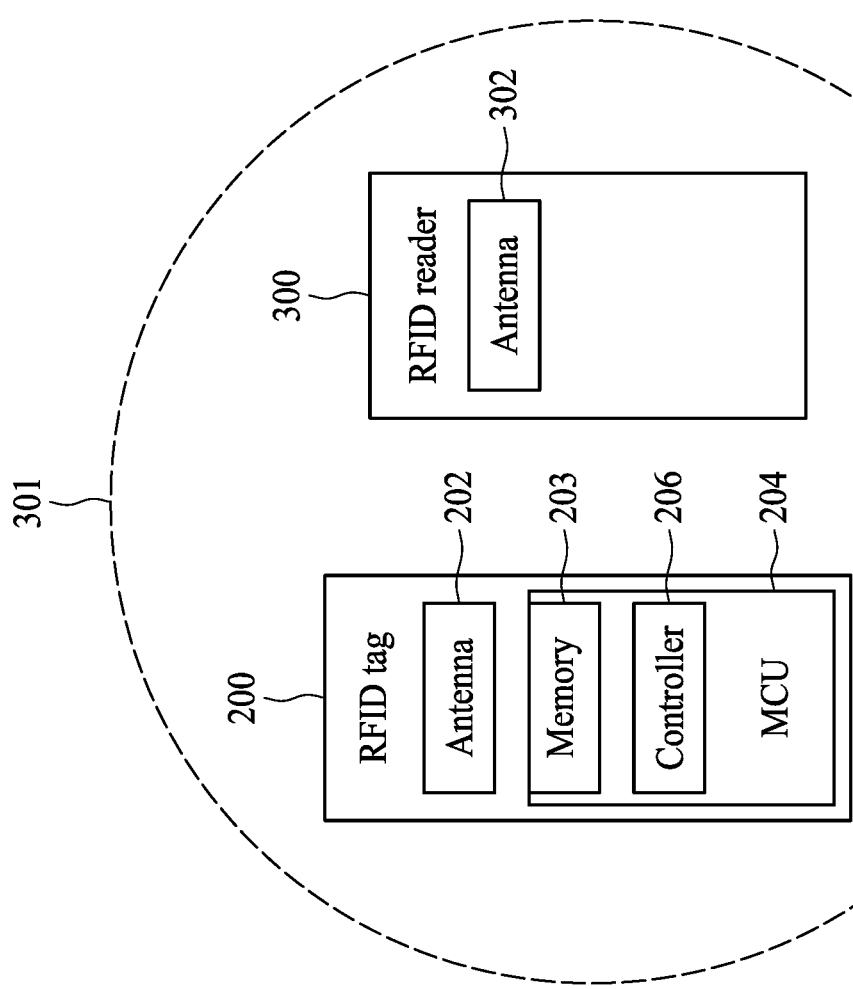

FIG. 2 and FIG. 3 are schematic diagrams showing the interaction between an RFID reader 300 and the electronic tag 200 in FIG. 1A, in accordance with some embodiments of the present disclosure. Referring to FIG. 2, initially, an antenna 302 of the RFID reader 300 generates an RF field 301, which can cover an area having a radius from as small as one inch to as large as 100 feet or more, depending on the power output and the operation frequency.

In some embodiments, when the electronic tag 200 moves into the RF field 301, the electronic tag 200 becomes active. In some embodiments, the antenna 202 of the electronic tag 200 sends data, stored in the memory 203 of the electronic tag 200, to the antenna 302 of the RFID reader 300. In some embodiments, the data includes, but is not limited to, the serial number of the electronic device, the manufacturing date of the electronic device, the temperature data and the humidity data.

In some embodiments, the RFID reader 300 sends a writing signal to the electronic tag 200. The antenna 202 of the electronic tag 200 receives the writing signal, and the MCU 204 of the electronic tag 200 decodes the writing signal and then writes the data to the memory 203 of the MCU 204. The data written to the memory 203 of the MCU 204 includes, but is not limited to, the serial number of the electronic device and the manufacturing date of the electronic device.

In some embodiments, the RFID reader 300 may communicates with the controller 206 of the electronic tag 200 for retrieving data from the memory 203 or writing data to the memory 203, and may further communicates with the controller 105 of the electronic device 100 through the electronic tag 200, which serves as a bridging device.

In some embodiments, the electronic tag 200 is an active tag. An active RFID tag has its own power source for performing its operation. One advantage of the active RFID tag, as compared to a passive RFID tag, is that the RFID reader 300 can be much farther away from the active RFID tag and still receive the signal sent from the active RFID tag. In some embodiments, the electronic tag 200 is a passive RFID tag. In contrast to the active RFID tag, the passive RFID tag does not require batteries, is much smaller in size and has a virtually unlimited lifespan.

Figure 4:
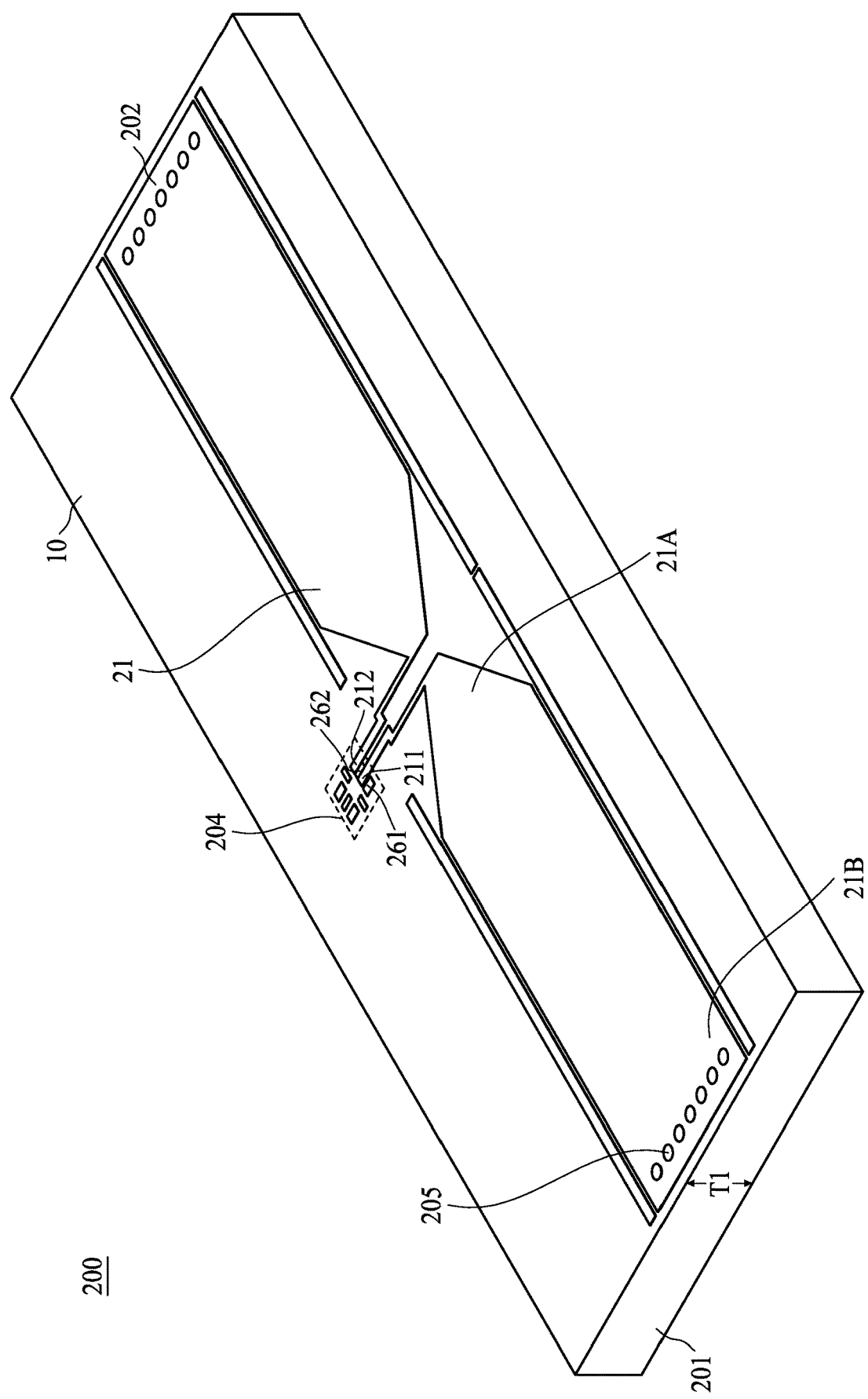
FIG. 4 is a schematic diagram showing a top side of the electronic tag, in accordance with some embodiments of the present disclosure.
Figure 5:
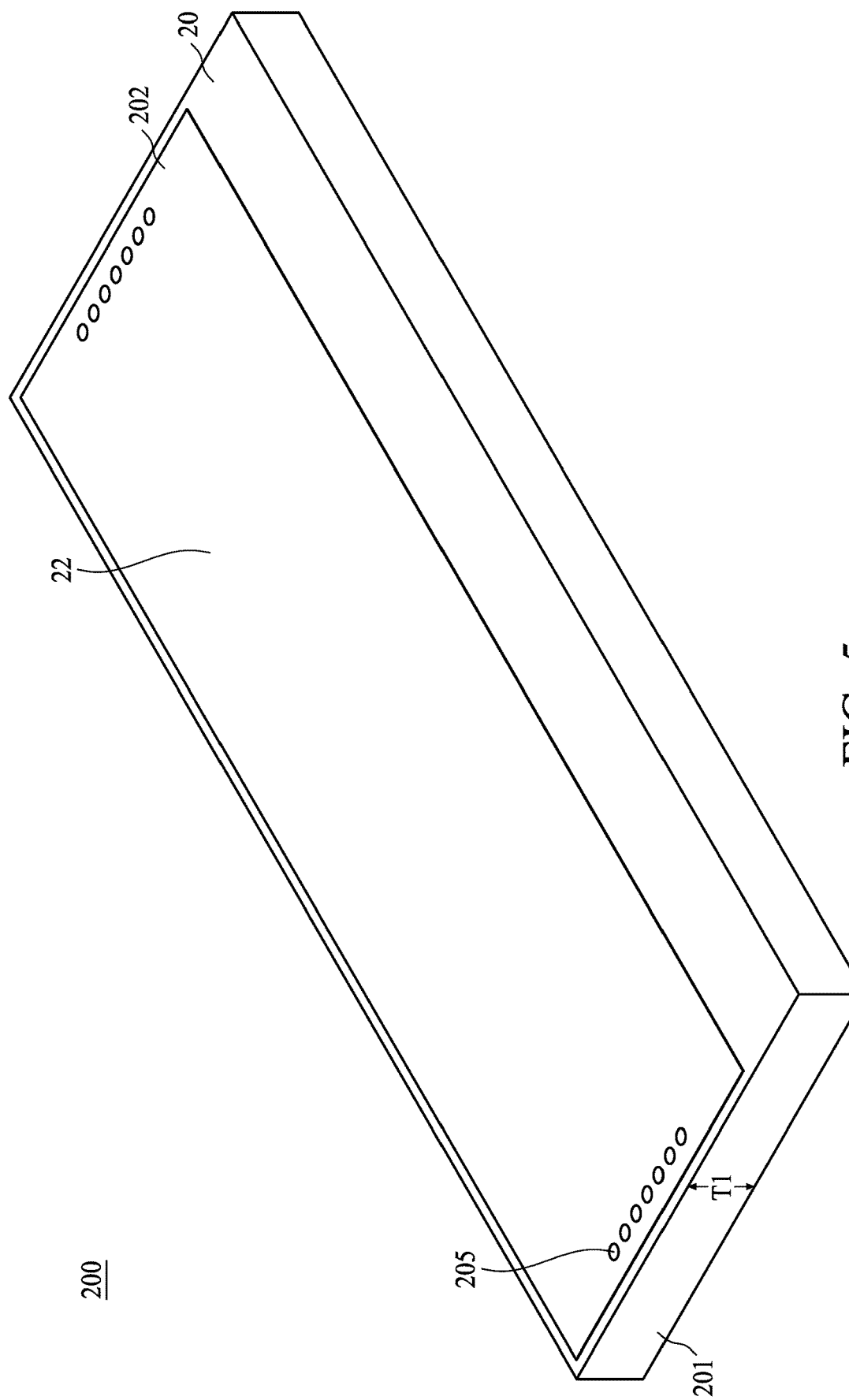
FIG. 5 is a schematic diagram showing a bottom side of the electronic tag, in accordance with some embodiments of the present disclosure.

FIG. 4 is a schematic diagram of the top side of the electronic tag 200, in accordance with some embodiments of the present disclosure. FIG. 5 is a schematic diagram of the bottom side of the electronic tag 200, in accordance with some embodiments of the present disclosure. Referring to FIG. 4 and FIG. 5, the electronic tag 200 includes a substrate 201, the MCU 204, and the antenna 202. The substrate 201 includes a top side 10 and a bottom side 20, wherein the top side 10 is opposite to the bottom side 20

In some embodiments, the MCU 204 includes the pins, RFN 262 and RFP 261; the antenna 202 includes the first end 211 and the second end 212. The RFN 262 of the MCU 204 is electrically coupled to the second end 212 of the antenna 202, and the RFP 261 of the MCU 204 is electrically coupled to the first end 211 of the antenna 202.

In some embodiments, the antenna 202 is disposed on the substrate 201 for receiving and transmitting data using RF signals. In some embodiments, the antenna 202 is made of thin metal strips of copper, aluminum, or silver. The strips are deposited on the substrate 201. In some embodiments, the antenna 202 is a printed antenna. In some embodiments, the antenna 202 is a loop antenna, wherein the antenna 202 includes a top portion 21, a bottom portion 22 and plating through holes 205, the top portion 21 is a substantially trapezoid conductor disposed on the top side 10 and the bottom portion 22 is a substantially rectangular conductor disposed on the bottom side 20. In some embodiments, the trapezoid conductor has a tapered end 21A, the first end 211 is electrically connected to the tapered end 21A, and the plated through holes 205 are disposed at one end 21B opposite to the tapered end 21A. RF signals are transmitted from the top portion 21, the bottom portion 22 and the plating through holes 205 of the antenna 202.

In some embodiments, a thickness T of the substrate 201 is about 3 millimeters, which is greater than thickness of existing RFID tags. Because the antenna 202 is the loop antenna, the antenna length includes the length of the top portion 21, the length of the bottom portion 22 and the length of the plating through holes 205; greater thickness of the substrate 201 increases the length of the plating through holes 205, thereby increasing the antenna length. The greater antenna length increases the access distance of the electronic tag 200.

In some embodiments, the operation frequency of the electronic tag 200 can be a low frequency (30-300 KHz), a high frequency (3-30 MHz), an ultra-high frequency (300-3000 MHz) and a microwave (2.45-5.8 GHz). In some embodiments, the operation frequency of the electronic tag 200 includes, but is not limited to, at least one of 135 KHz, 13.56 MHz and 433.92 MHz.

Figure 6:
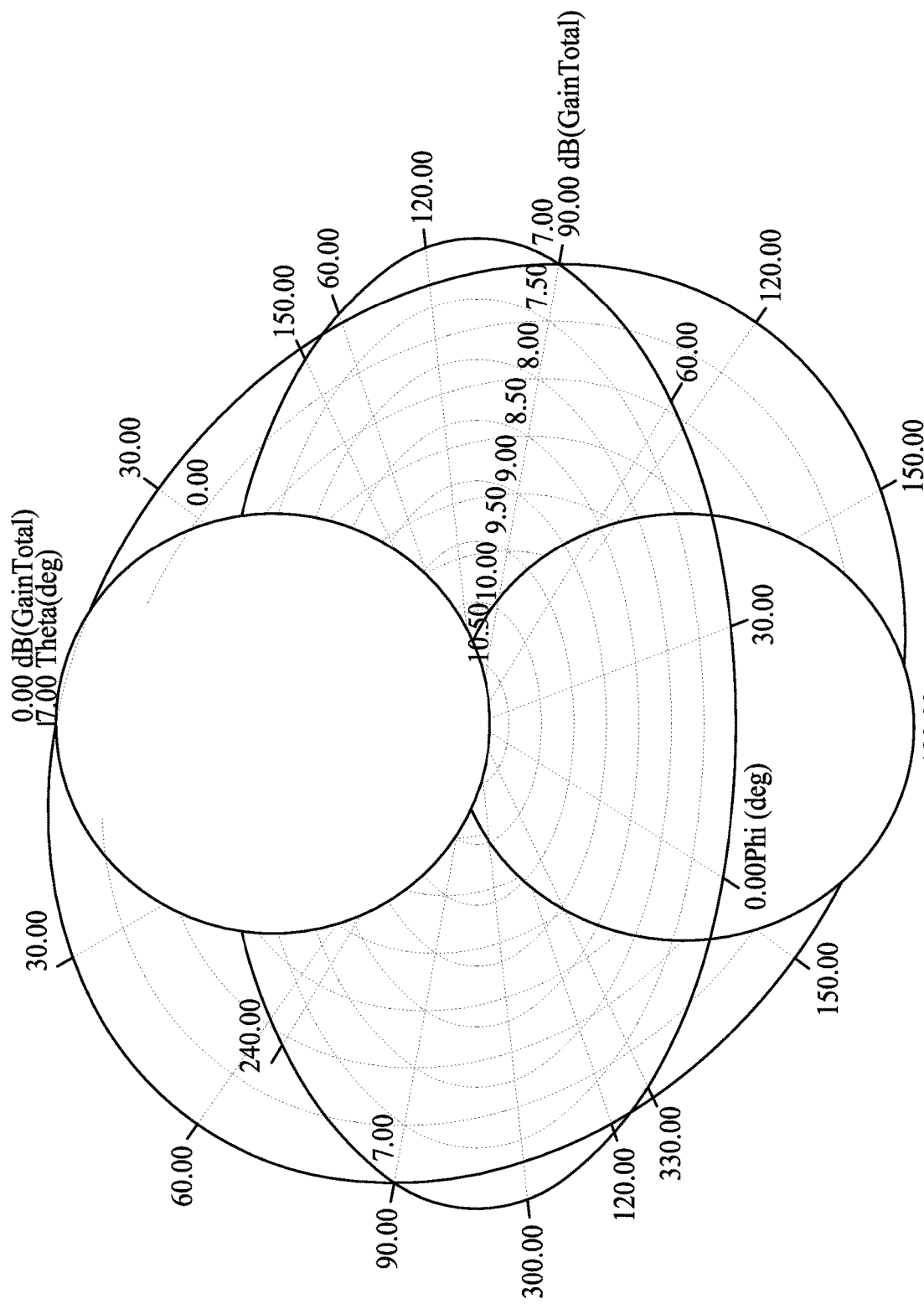
FIG. 6 is a radiation pattern of an antenna of the electronic tag, in accordance with some embodiments of the present disclosure.

FIG. 6 is a radiation pattern of the antenna of the RFID tag 200 in FIG. 4, in accordance with some embodiments of the present disclosure. Referring to FIG. 6, the radiation pattern of the antenna of the RFID tag 200 (not shown in FIG. 6) shows that radiation transmitted from the antenna 202 is concentrated in areas above the RFID tag 200 and below the RFID tag 200.

Figure 7:
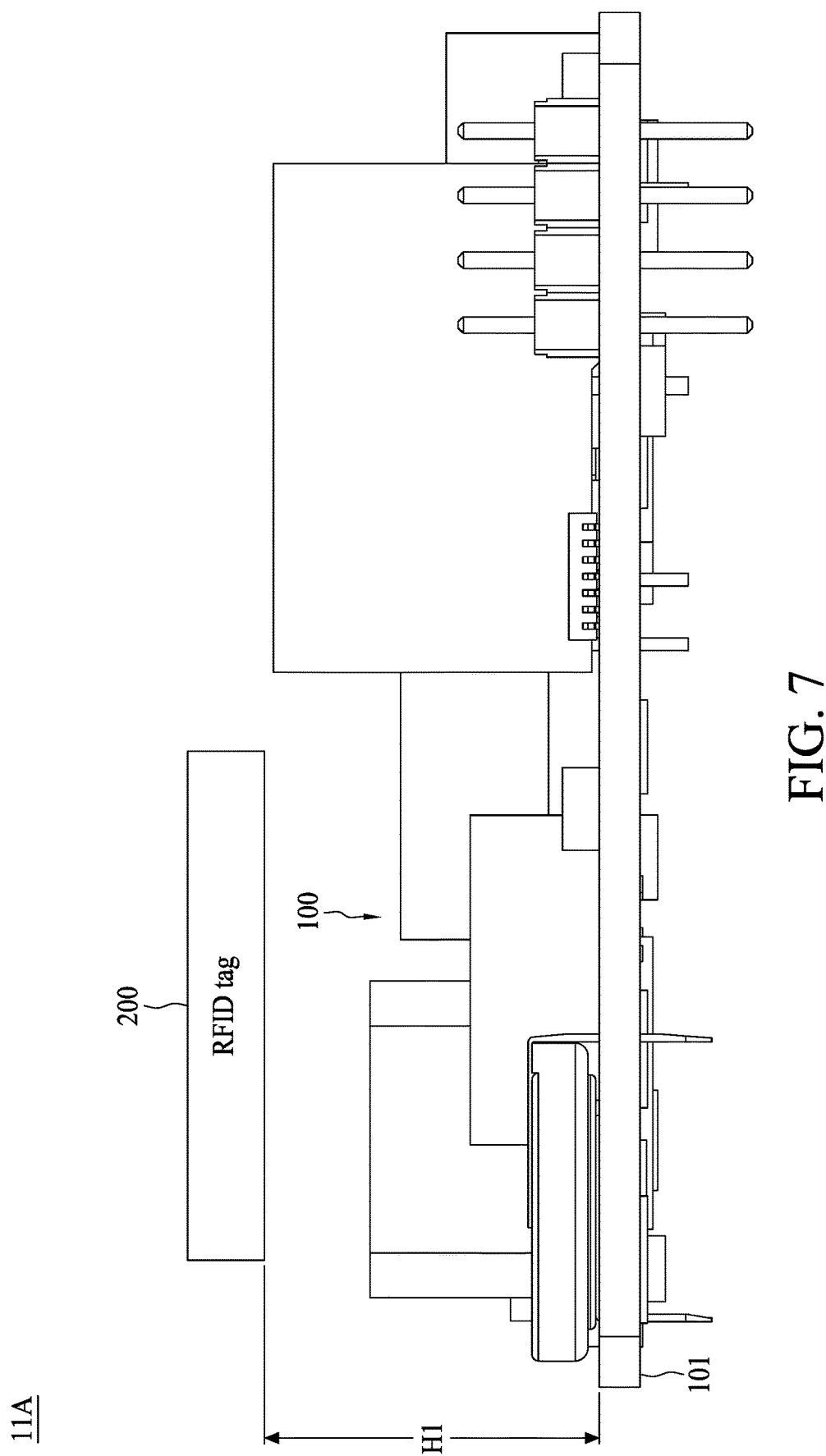
FIG. 7 is a schematic diagram showing the electronic system including the electronic device and the electronic tag, in accordance with some embodiments of the present disclosure.

FIG. 7 is a schematic diagram of the electronic system 11A including the electronic device 100 and the electronic tag 200, in accordance with some embodiments of the present disclosure. Referring to FIG. 7, in some embodiments, the electronic tag 200 is disposed at a first height H1 over a printed circuit board 101 of the electronic device 100, the MCU 204 (the identification integrated circuit chip) of the electronic tag 200 is not electrically connected to the printed circuit board 101. In some embodiments, the printed circuit board 101 generally contains at least one metal layer (or multiple metal layers), which serves as a reflector to reflect the electromagnetic radiation transmitted from the antenna 206 of the electronic tag 200. In some embodiments, the reflector can be implemented by an external metal sheet disposed below the electronic tag 200. Consequently, the electromagnetic radiation transmitted from the antenna (not shown in FIG. 6) of the electronic tag 200 can be concentrated above the electronic tag 200, thereby extending the access distance of the electronic tag 200. In some embodiments, the first height H1 is about 2 centimeters.

Figure 9:
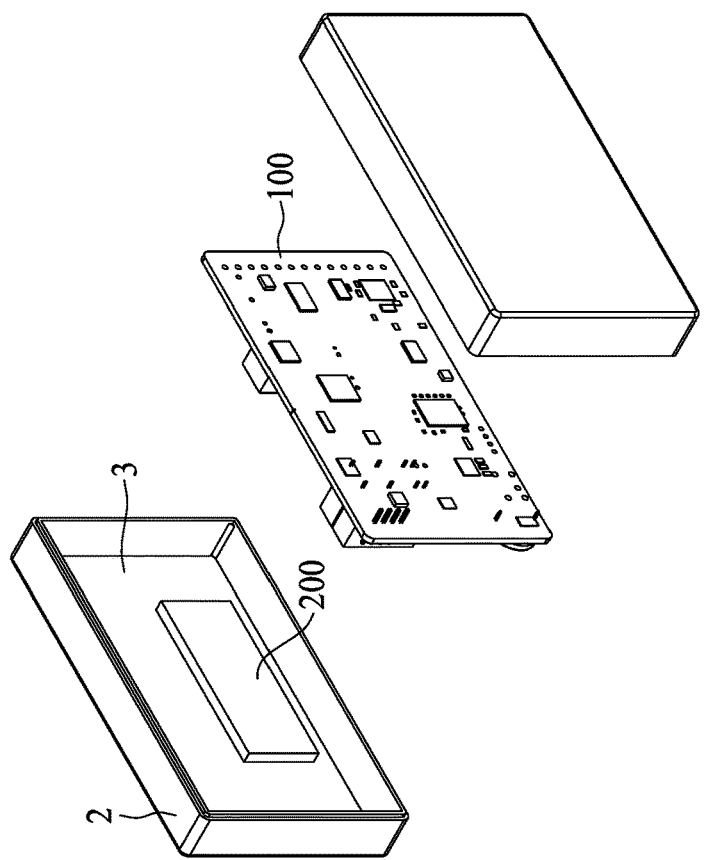
FIG. 8 and FIG. 9 are schematic disassembled diagrams showing and the application of the electronic tag, in accordance with some embodiments of the present disclosure.
Figure 8:
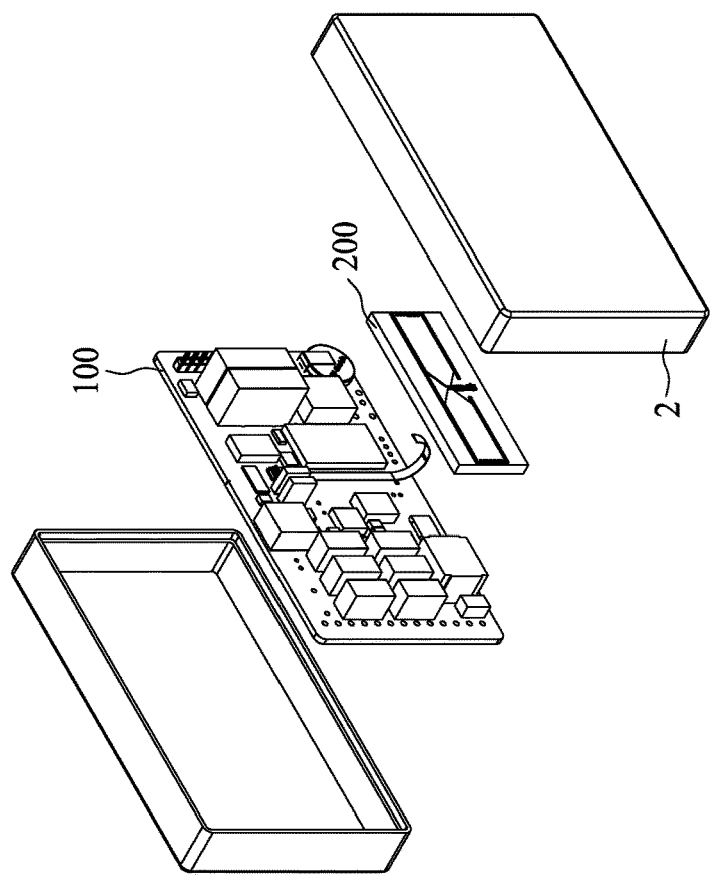

FIG. 8 and FIG. 9 are schematic disassembled diagrams showing the application of the electronic tag 200, in accordance with some embodiments of the present disclosure. Referring to FIG. 8 and FIG. 9, in some embodiments, a housing 2 has an inner side 3, and the electronic tag 200 is affixed to the inner side 3 using the adhesive (not shown in the drawings). In some embodiments, the housing 2 is used to contain the electronic device 100, and the inner side 3 faces the printed circuit board 101 of the electronic device 100. In some embodiments, the housing 2 may be used to contain a non-electronic device; in other words, the electronic device 100 is replaced by a non-electronic device; and the electronic tag 200 is affixed to the inner side 3 of the housing 2 to implement the identifying and tracking of the non-electronic device.

The cost for preparing the printed circuit board for transmitting and receiving wireless signals such as microwave signal is very expensive. In some embodiments, the electronic tag 200 affixed on the housing 2 can conserve the space of the printed circuit board 101 and simplify the layout of the printed circuit board 101; in other words, the printed circuit board does not includes an identification integrated circuit chip such as the RFID chip. Consequently, the cost for preparing the printed circuit board can be dramatically decreased.

In addition, the design and preparation of the printed circuit board without the identification integrated circuit chip is much simpler than that of the printed circuit board with the identification integrated circuit chip. In practice, the printed circuit board 101 of the electronic device 100 can be designed and prepared independent of the identification integrated circuit chip, i.e., without a space for the identification integrated circuit chip; subsequently, the electronic tag 200 carrying the MCU 204 (the identification integrated circuit chip) can be prepared and affixed to the inner side 3 of the housing 2, for identifying and tracking the electronic device 100.

Furthermore, some non-electronic devices do not have a printed circuit board, and it is inherently not possible to implement an electronic tag in the non-electronic devices for identifying and tracking the non-electronic devices. In practice, the electronic tag 200 carrying the MCU 204 (the identification integrated circuit chip) can be prepared and affixed to the inner side of the housing of the non-electronic devices, so as to implement the identifying and tracking of the non-electronic devices.

Figure 10:
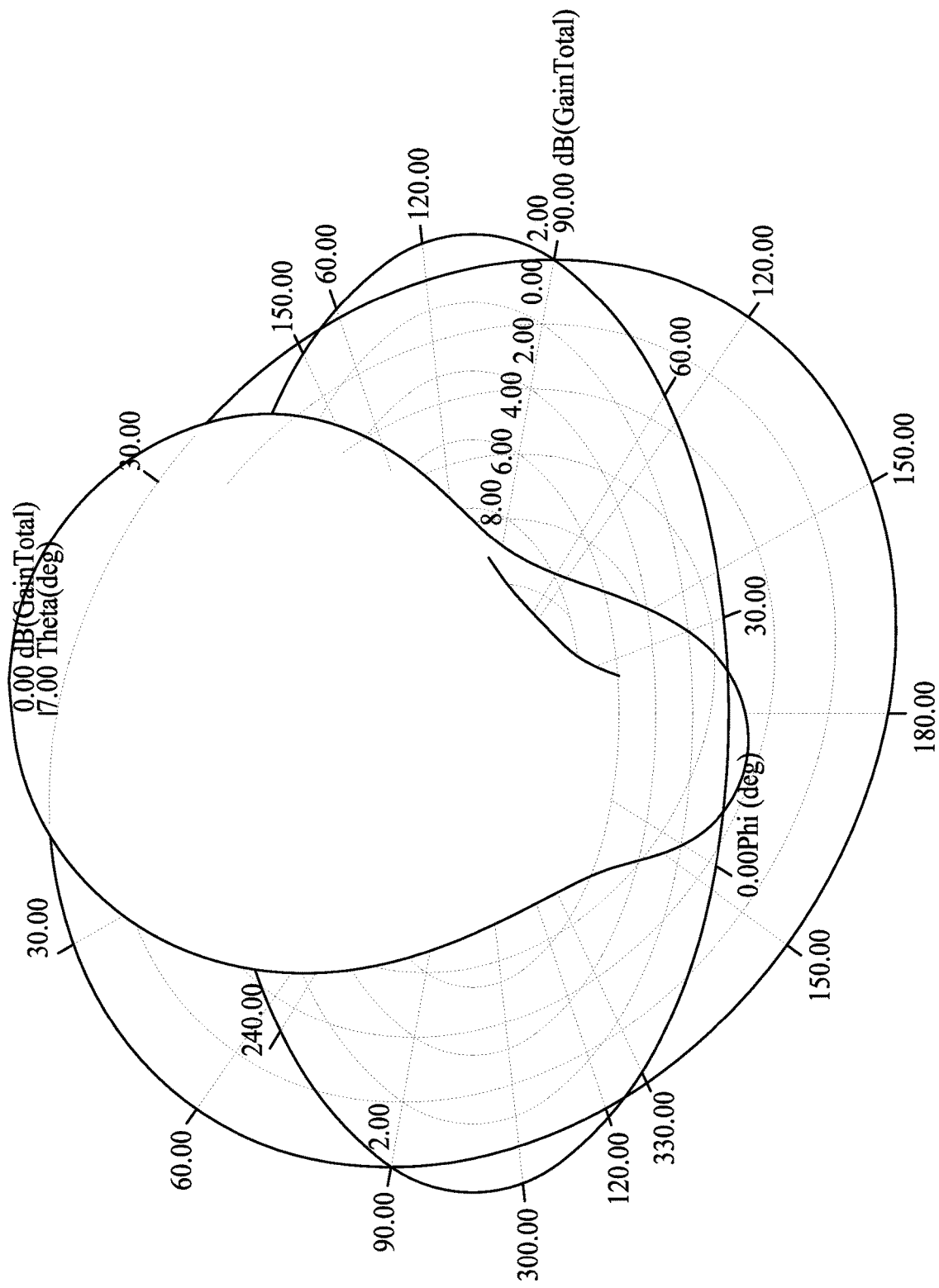
FIG. 10 is a radiation pattern of the antenna of the electronic tag housed with a printed circuit board of the electronic device, in accordance with some embodiments of the present disclosure.

FIG. 10 is a radiation pattern of the antenna housed with the printed circuit board, in accordance with some embodiments of the present disclosure. The printed circuit board generally contains at least one metal layer (or multiple metal layers), which is used as a reflector to reflect the electromagnetic radiation transmitted from the antenna (not shown in FIG. 10), which causes the radiation to be concentrated above the RFID tag as compared with the radiation pattern in FIG. 6, thereby extending the access distance of the RFID tag.

Near-field communication (NFC) is another contactless application; NFC is a set of communication protocols that establishes communication between two electronic devices, one of which is usually a portable device such as a smartphone, by bringing them within about 4 centimeters of each other.

Figure 11:
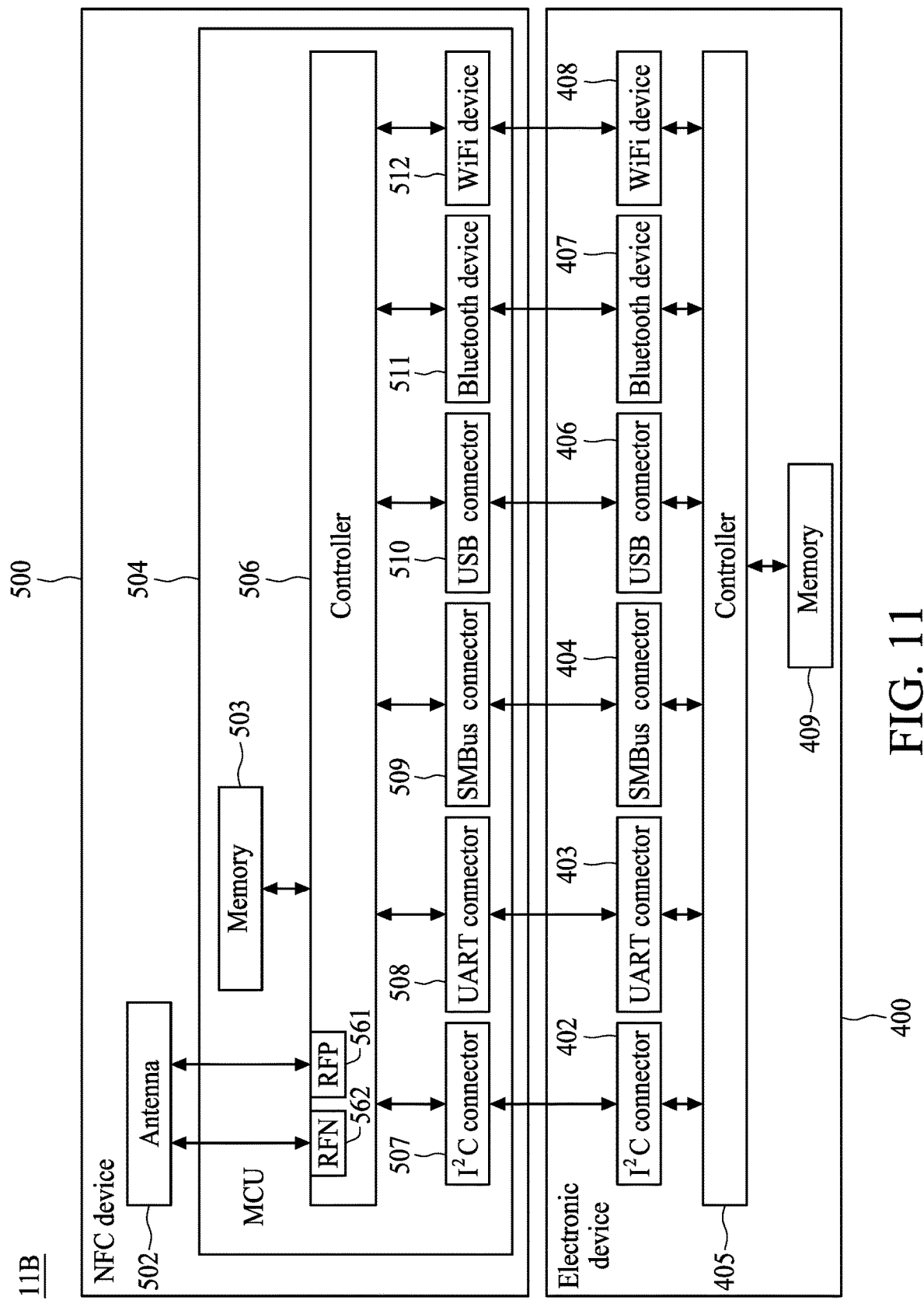
FIG. 11 is a schematic diagram showing an electronic system including an NFC device and an electronic device, in accordance with some embodiments of the present disclosure.

FIG. 11 is a schematic diagram of an NFC device 500 and an electronic device 400, in accordance with some embodiments of the present disclosure. Referring to FIG. 11, the NFC device 500 includes an antenna 502 and an MCU 504. In some embodiments, the MCU 504 includes a memory 503, a controller 506, an I2C connector 507, a UART connector 508, an SMBus connector 509 and a USB connector 510.

In some embodiments, the controller 506 includes two pins, RFN 562 and RFP 561 for receiving and transmitting RF signals, the RFN 562 of the controller 506 is electrically coupled to the antenna 502 and the RFP 561 of the controller 506 is electrically coupled to the antenna 502 for RF signals processing.

The controller 506 is electrically coupled to the I2C connector 507, the UART connector 508, the SMBus connector 509 and the USB connector 510. In some embodiments, the controller 506 includes system firmware. In some embodiments, the I2C connector 507, the UART connector 508, the SMBus connector 509 and the USB connector 510 are configured for updating the system firmware of the controller 506.

The electronic device 400 includes an I2C connector 402, a UART connector 403, an SMBus connector 404, a controller 405, a USB connector 406 and a memory 409. The I2C connector 402 is electrically coupled to the I2C connector 507, the UART connector 403 is electrically coupled to the UART connector 508, the SMBus connector 404 is electrically coupled to the SMBus connector 509, and the USB connector 406 is electrically coupled to the USB connector 510.

In some embodiments, the memory 409 is configured for storing data. In some embodiments, the memory 409 includes, but is not limited to, at least one of Flash, Read-Only Memory (ROM), Read-Write Memory, Random Access Memory (RAM), Electrically Erasable Programmable Read-Only Memory (EEPROM) and any non-volatile memory. In some embodiments, the data includes, but is not limited to, at least one of the serial number of the electronic device 400, the manufacturing date of the electronic device 400, a music file, a video file or any other type of data.

In some embodiments, the controller 405 communicates with the controller 506 for retrieving the data from the memory 503 or for writing the data to the memory 503 via the UART connector 103 and the UART connector 508. In some embodiments, the controller 405 communicates with the controller 506 for retrieving the data from the memory 503 or for writing the data to the memory 503 via the SMBus connector 404 and the SMBus connector 509.

In some embodiments, the controller 405 communicates with the controller 506 for retrieving the data from the memory 503 or for writing the data to the memory 503 via the USB connector 106 and the USB connector 510.

In some embodiments, the electronic device 400 further includes a Bluetooth device 407 or a Wi-Fi device 408. In some embodiments, the NFC device 500 further includes a Bluetooth device 511 or a Wi-Fi device 512. In some embodiments, the device 400 communicates with the NFC device 500 via the Bluetooth device 407 and the Bluetooth device 511. In some embodiments, the device 400 communicates with the NFC device 500 via the Wi-Fi device 408 and the Wi-Fi device 512.

Figure 12:
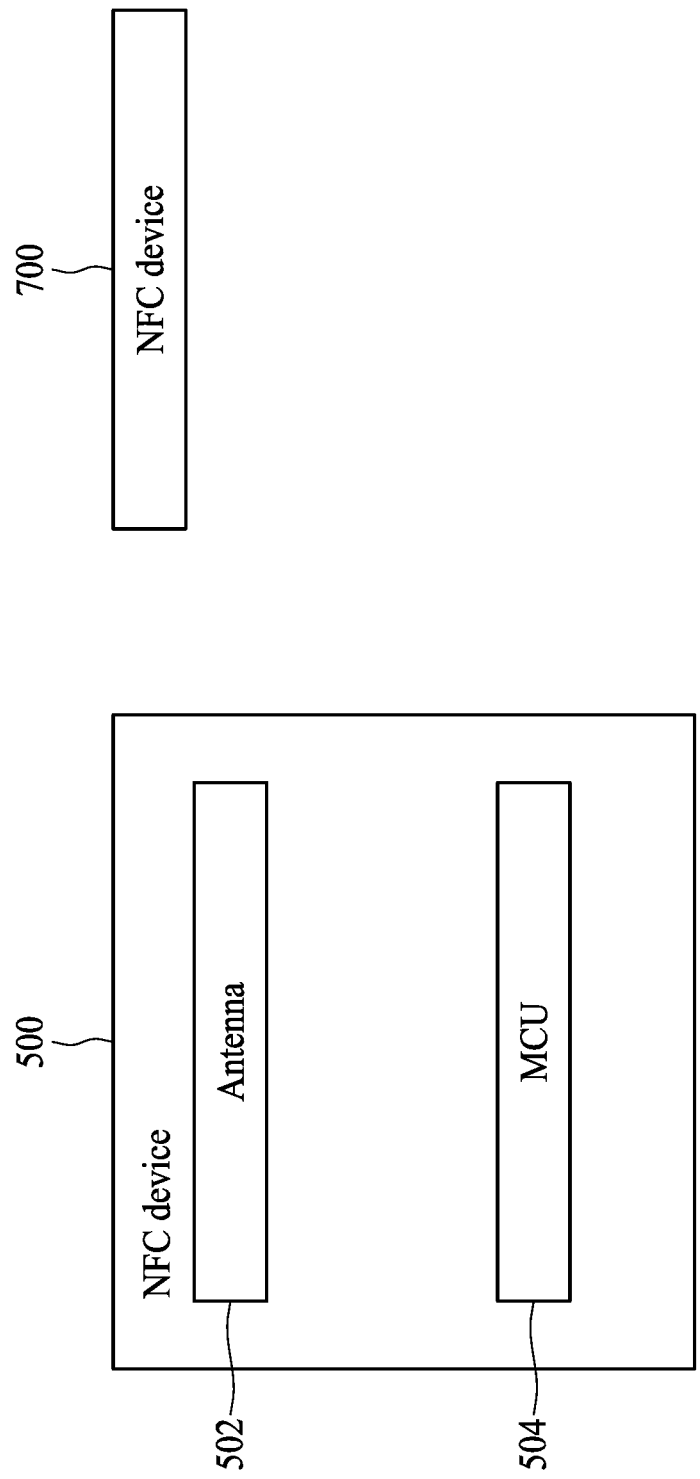
FIG. 12 is a schematic diagram showing two NFC devices, in accordance with some embodiments of the present disclosure.

FIG. 12 is a schematic diagram of the NFC device 500 and an NFC device 700, in accordance with some embodiments of the present disclosure. Referring FIG. 11 and FIG. 12, in some embodiments, the electronic device 400 is a network switch and needs to update a configuration file stored in the memory 503. The configuration file is configured to set up a routing table and an account database. In order to update the routing table and the account database of the electronic device 400, at first the NFC device 700 communicates with the NFC device 500 via NFC peer-to-peer mode, then the NFC device 700 sends RF signals having commands for updating the configuration file to an antenna 502 of the NFC device 500. The antenna 502 of the NFC device 500 receives the RF signals, and the controller 506 of the NFC device 500 decodes the commands and proceeds to update the configuration file for the electronic device 400.

In some embodiments, the controller 506 communicates with the controller 405 for updating the configuration file stored in the memory 409 via the I2C connector 507 and the I2C connector 402. In some embodiments, the controller 506 communicates with the controller 405 for updating the configuration file stored in the memory 409 via the UART connector 508 and the UART connector 403. In some embodiments, the controller 506 communicates with the controller 405 for updating the configuration file stored in the memory 409 via the SMBus connector 509 and the SMBus connector 404. In some embodiments, the controller 506 communicates with the controller 405 for updating the configuration file stored in the memory 409 via the USB connector 510 and the USB connector 406.

Referring to FIG. 12, in some embodiments, the NFC device 700 communicates with the NFC device 500, wherein the NFC device 700 works in reader/writer mode and the NFC device 500 works in card-emulation mode. In some embodiments, the NFC device 700 communicates with the NFC device 500 using RF signals. The NFC device 700 sends a reading signal to the antenna 502 and then the MCU 504 decodes the reading signal and retrieves data stored in the memory of the MCU 504. The antenna 502 sends another signal including the data to the NFC device 700. In some embodiments, the NFC device 700 sends a writing signal to the NFC device 500; the MCU 504 decodes the writing signal and then writes data to the memory of the MCU 504. In some embodiments, the NFC device 700 includes, but is not limited to, a smart phone, a laptop computer or an NFC reader.

In some embodiments, the NFC device 500 is an active NFC device, and therefore has its own power source for performing its operation. One advantage of the active NFC device, as compared to a passive NFC device, is that a reader can be much farther away from the active NFC device and still receive the signal from the active NFC device. In some embodiments, the NFC device 500 is a passive NFC device. In contrast to the active NFC device, the passive NFC device does not require a battery, is much smaller in size and has a virtually unlimited lifespan.

Figure 13:
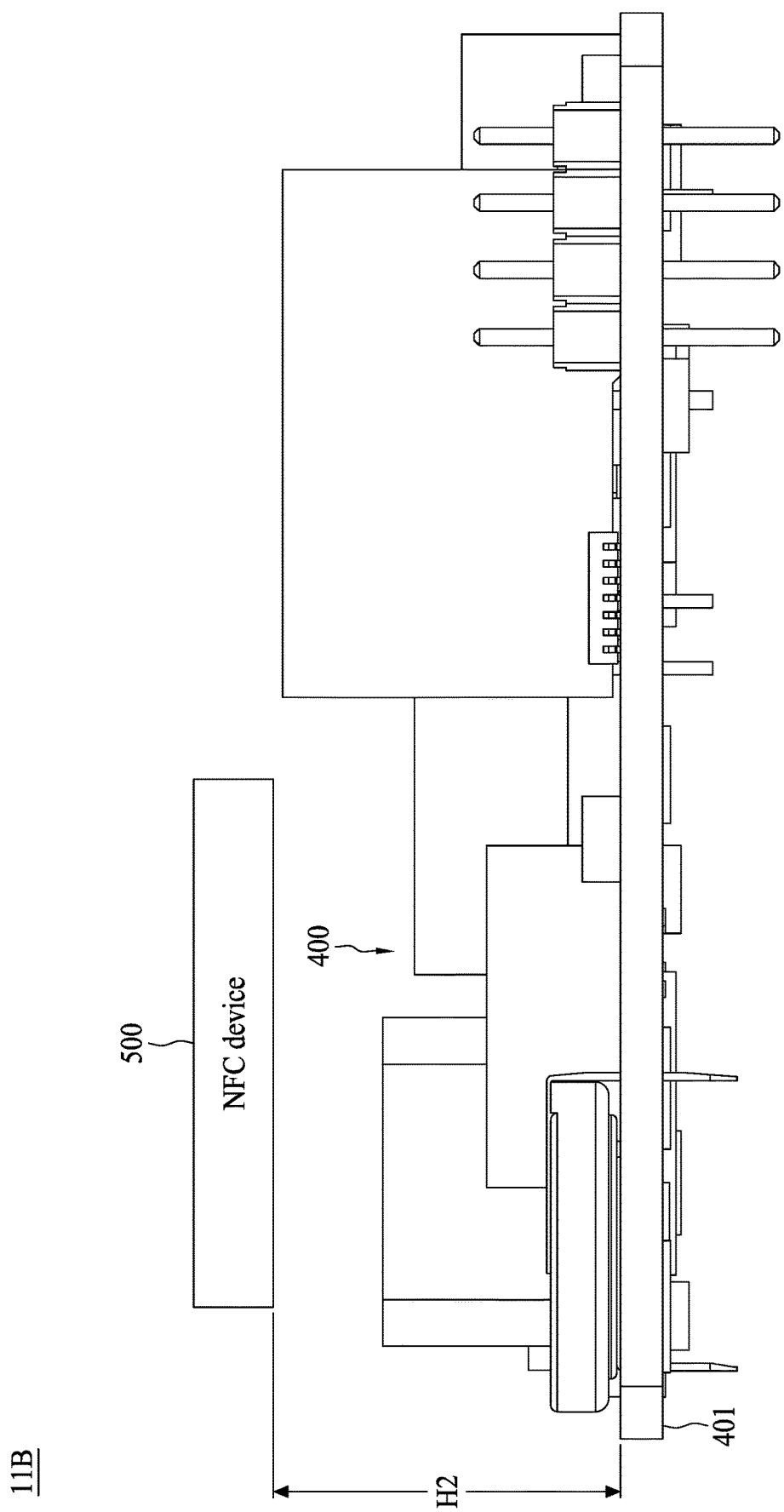
FIG. 13 is a schematic diagram of the electronic device and the NFC device, in accordance with some embodiments of the present disclosure.

FIG. 13 is a schematic diagram of the electronic system 11B including electronic device 400 and the NFC device 500, in accordance with some embodiments of the present disclosure. Referring to FIG. 13, in some embodiments, the NFC device 500 is disposed at a second height H2 over a printed circuit board 401, and the MCU 504 (the identification integrated circuit chip) of the NFC device 500 is not electrically connected to the printed circuit board 401. In some embodiments, the printed circuit board 401 of the electronic device 400 generally contains at least one metal layer (or multiple metal layers), which serves as a reflector to reflect the electromagnetic radiation transmitted from the antenna 502 (not shown in FIG. 13) of the NFC device 500, which causes the radiation to be concentrated above the NFC device 500, thereby extending the access distance of the NFC device 500. In some embodiments, the second height H2 is about 2 centimeters.

Figure 15:
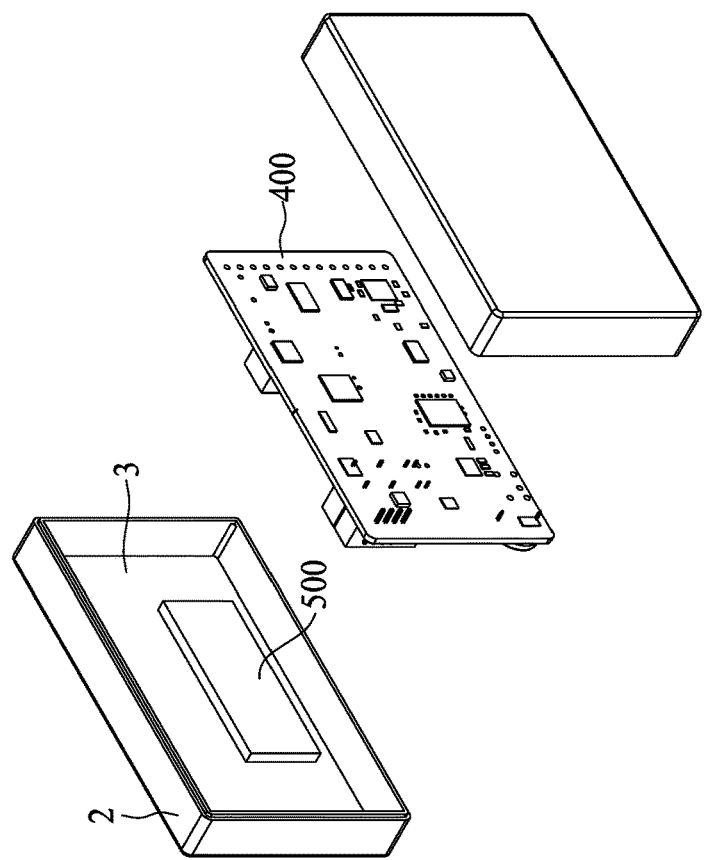
FIG. 14 and FIG. 15 are schematic disassembled diagrams of the electronic device and the NFC device, in accordance with some embodiments of the present disclosure.
Figure 14:
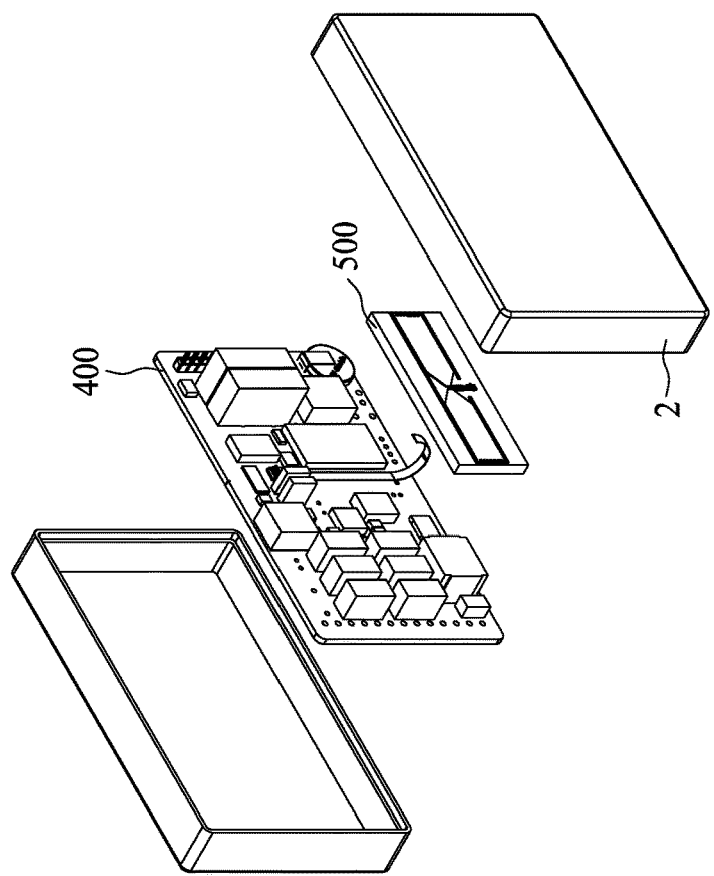

FIG. 14 and FIG. 15 are schematic disassembled diagrams of the electronic system 11B including the electronic device 400 and the NFC device 500, in accordance with some embodiments of the present disclosure. Referring to FIG. 14 and FIG. 15, the electronic system 11B includes the housing 2, wherein the first side 10 of the housing 2 faces the electronic device 400. In some embodiments, the NFC device 500 is affixed to the first side 10. In some embodiments, the NFC device 500 is affixed to the first side 10 using the adhesive (not shown in the drawings).

Figure 16:
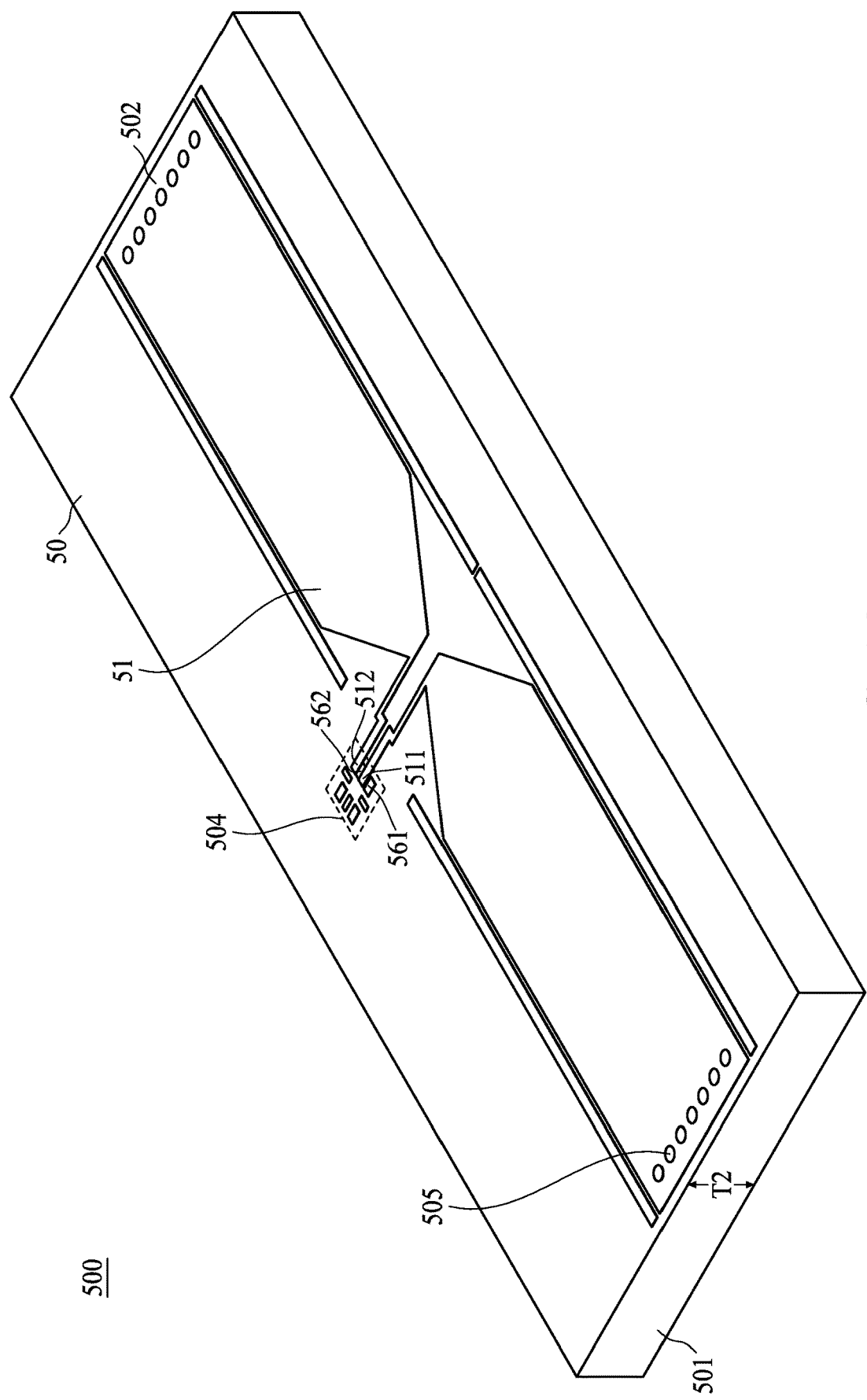
FIG. 16 is a schematic diagram showing a top side of the NFC device, in accordance with some embodiments of the present disclosure.
Figure 17:
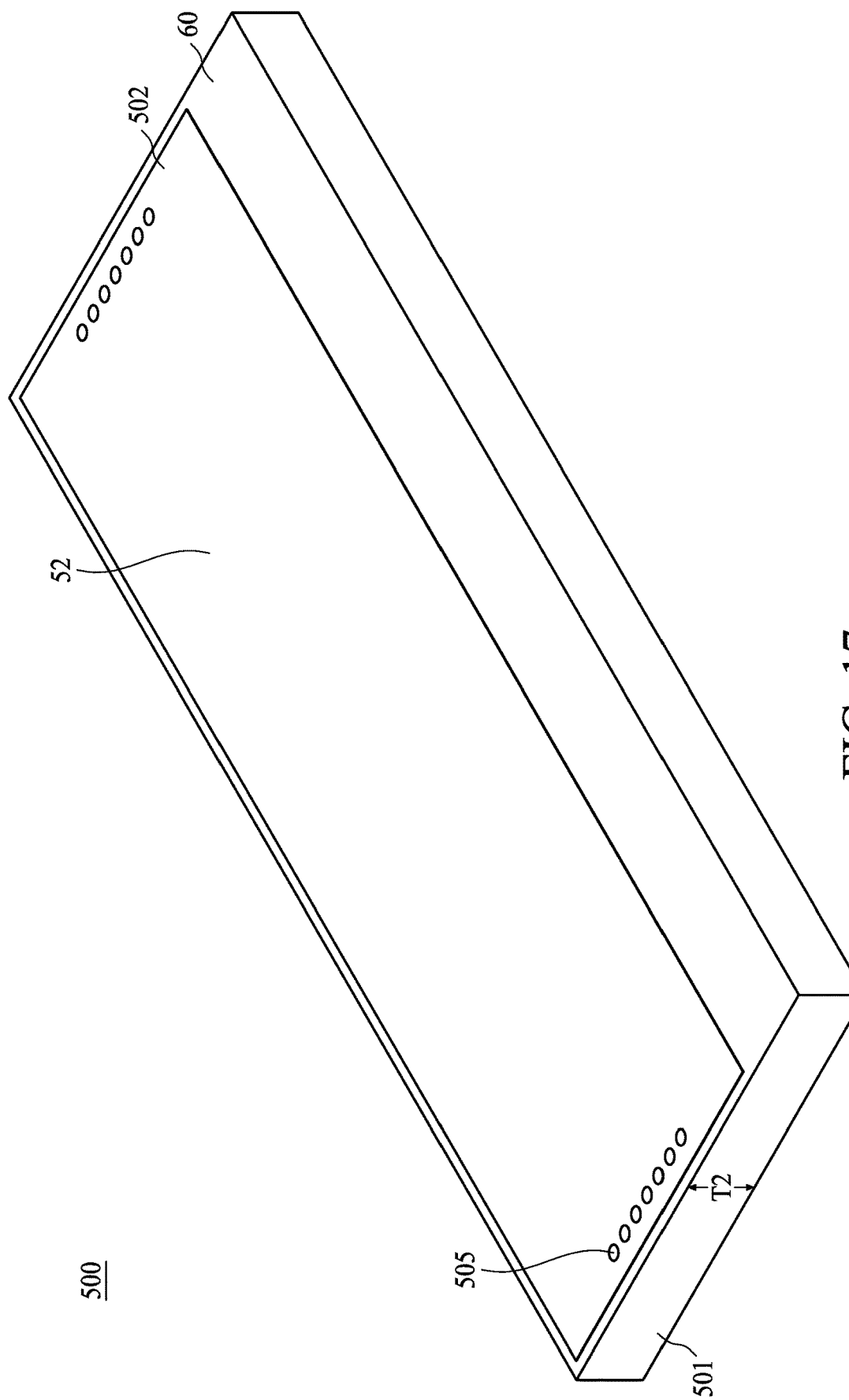
FIG. 17 is a schematic diagram showing a bottom side of the NFC device, in accordance with some embodiments of the present disclosure.

FIG. 16 is a schematic diagram of the top side of the NFC device 500, in accordance with some embodiments of the present disclosure. FIG. 17 is a schematic diagram of the bottom side of the NFC device 500, in accordance with some embodiments of the present disclosure. Referring to FIG. 16 and FIG. 17, the NFC device 500 includes a substrate 501, the antenna 502 and the MCU 504. The substrate 501 includes a top side 50 and a bottom side 60, wherein the top side 50 is opposite to the bottom side 60. In some embodiments, the antenna 502 is disposed on the substrate 501 for receiving and transmitting data using RF signals.

In some embodiments, the MCU 504 includes the pins, RFN 562 and RFP 561, the antenna 502 includes a first end 511 and a second 512. The RFN 562 of the MCU 504 is electrically coupled to the second end 512 of the antenna 502 and the RFP 561 of the MCU 504 is electrically coupled to the first end 511 of the antenna 502. In some embodiments, the antenna 502 is made of thin metal strips of copper, aluminum, or silver. The strips are deposited on the substrate 501. In some embodiments, the antenna 502 is a printed antenna.

In some embodiments, the antenna 502 is a loop antenna, and includes a top portion 51, a bottom portion 52 and plating through holes 505, wherein the top portion 51 is disposed on the top side 50 and the bottom portion 52 is disposed on the bottom side 60, so that RF signals are transmitted from the top portion 51, the bottom portion 52 and the plating through holes 505 of the antenna 502.

In some embodiments, the substrate 501 has a thickness T2, e.g., about 3 millimeters, which is greater than the thickness of existing NFC tags. Because the antenna 502 is the loop antenna, the antenna length includes the length of the top portion 51, the length of the bottom portion 52 and the length of plating through holes 505. The greater thickness increases the length of plating through holes 505, thereby increasing the antenna length. The greater antenna length causes the longer access distance of the NFC device 500. An NFC operation frequency of the RF signal includes, but is not limited to, 13.56 MHz.

Figure 18:
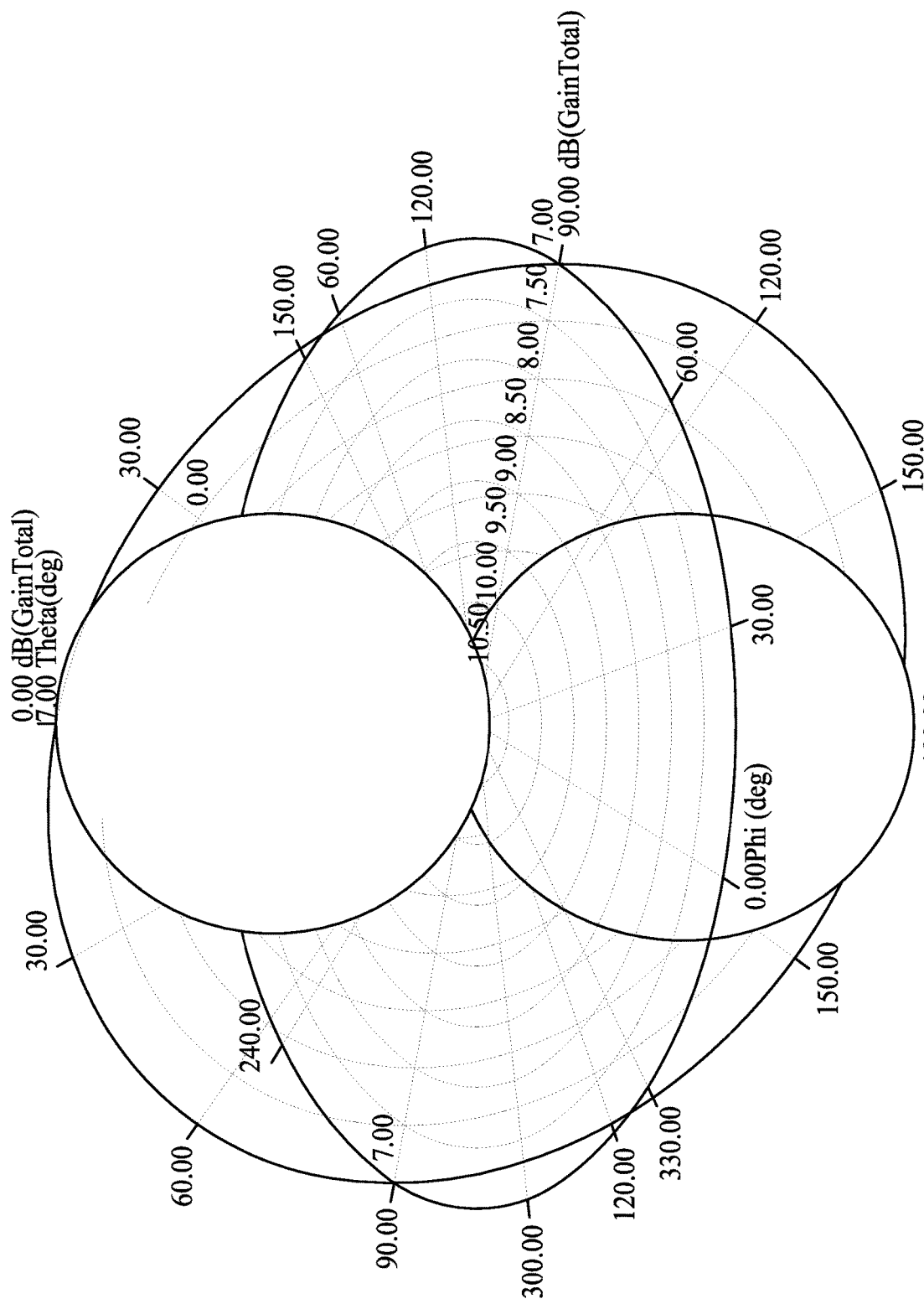
FIG. 18 is a radiation pattern of an antenna of the NFC device, in accordance with some embodiments of the present disclosure.

FIG. 18 is a radiation pattern of the antenna of the NFC device, in accordance with some embodiments of the present disclosure. Referring to FIG. 18, a radiation pattern of the antenna of the NFC device shows that the radiation transmitted from the antenna is concentrated in areas above the antenna and below the antenna because the antenna is the loop antenna.

Figure 19:
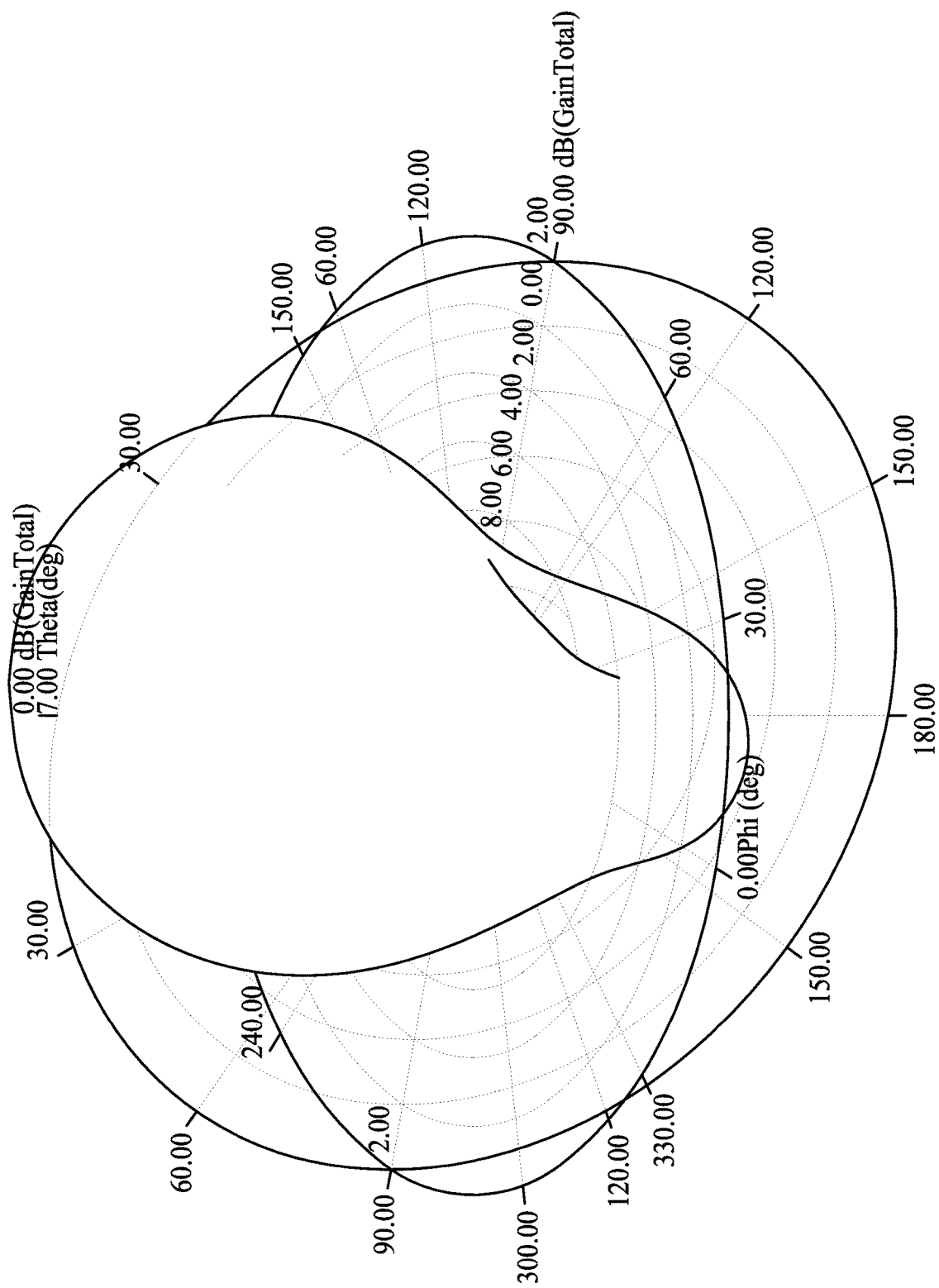
FIG. 19 is a radiation pattern of the antenna of the NFC device housed with a printed circuit board of the electronic device, in accordance with some embodiments of the present disclosure.

FIG. 19 is a radiation pattern of the antenna disposed over the printed circuit board, in accordance with some embodiments of the present disclosure. Referring to FIG. 13 and FIG. 19, the printed circuit board 401 generally contains at least one metal layer (or multiple metal layers), which is used as a reflector to reflect electromagnetic radiation transmitted from the antenna 502 of the NFC device 500, causing the radiation to be concentrated above the NFC device 500, and thereby extending the access distance of the NFC device 500.

With the electronic system of the present disclosure, when the substrate 201 holding the antenna 202 is disposed at the first height H1 over the printed circuit board 101 of the electronic device 100, the printed circuit board 101 generally contains at least one metal layer (or multiple metal layers), which is used as a reflector for the electronic tag 200 to reflect electromagnetic radiation transmitted from the antenna 202 of the electronic tag 200. Therefore, the electromagnetic radiation is concentrated above the electronic tag 200, thereby extending the access distance of the electronic tag 200.

In contrast, with an existing electronic device, the RFID tag is disposed in the printed circuit board of the electronic device without any mechanism capable of effectively extending the access distance.

One aspect of the present disclosure provides an electronic tag. The electronic tag comprises a substrate and an antenna; the substrate has a first side and a second side, wherein the first side is opposite to the second side; the antenna has a first portion and a second portion, wherein the first portion is disposed on the first side, the second portion is disposed on the second side, and the first portion is electrically coupled to the second portion via plated through holes.

Another aspect of the present disclosure provides an electronic system comprises an electronic device and an electronic tag. The electronic device comprises a printed circuit board. The electronic tag comprises a substrate and an antenna, wherein the substrate is disposed at a height over the printed circuit board; the substrate has a first side and a second side, wherein the first side is opposite to the second side; the antenna has a first portion and a second portion, wherein the first portion is disposed on the first side, the second portion is disposed on the second side, and the first portion is electrically coupled to the second portion via plated through holes.

Another aspect of the present disclosure provides an electronic system comprising a device and an electronic tag. The device has a housing, and the electronic tag is affixed on the housing. The electronic tag affixed on comprises a substrate having a first side and a second side, wherein the first side is opposite to the second side; an antenna having a first portion and a second portion, wherein the first portion is disposed on the first side, the second portion is disposed on the second side, and the first portion is electrically coupled to the second portion via plated through holes; and an identification integrated circuit chip having a first pin and a second pin, wherein the first pin is electrically connected to a first end of the antenna, and the second pin electrically connected to a second end of the antenna.

Although the present disclosure and its advantages have been described in detail, it should be understood that various changes, substitutions and alterations can be made herein without departing from the spirit and scope of the disclosure as defined by the appended to claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An electronic tag, comprising:
    a substrate having a first side and a second side, wherein the first side is opposite to the second side; and
    an antenna having a first portion and a second portion, wherein the first portion is disposed on the first side, the second portion is disposed on the second side, and the first portion is electrically coupled to the second portion via plated through holes;
    wherein the first portion includes a substantially trapezoid conductor having a tapered end, a first end of the antenna is electrically connected to the tapered end, and the plated through holes are disposed at one end opposite to the tapered end.

2. The electronic tag of claim 1, further comprising a micro control unit (MCU), the MCU comprises a controller having a first pin and a second pin, the first pin is electrically connected to the first end of the antenna, and the second pin electrically connected to a second end of the antenna.

3. The electronic tag of claim 2, wherein the MCU further comprises a third pin and a fourth pin electrically connected to an I$^2$C bus.

4. The electronic tag of claim 1, wherein the second portion is substantially a rectangular conductor.

5. The electronic tag of claim 1, further comprising an identification integrated circuit chip having a first pin and a second pin, wherein the first pin is electrically connected to a first end of the antenna, and the second pin electrically connected to a second end of the antenna.

6. An electronic system, comprising:
an electronic device, comprising a printed circuit board;
an electronic tag, comprising:
a substrate having a first side and a second side, wherein the substrate is disposed at a height over the printed circuit board, and the first side is opposite to the second side; and
an antenna having a first portion and a second portion, wherein the first portion is disposed on the first side, the second portion is disposed on the second side, and the first portion is electrically coupled to the second portion via plated through holes;
wherein the first portion includes a substantially trapezoid conductor having a tapered end, a first end of the antenna is electrically connected to the tapered end, and the plated through holes are disposed at one end opposite to the tapered end.

7. The electronic system of claim 6, wherein the second portion is substantially a rectangular conductor.

8. The electronic system of claim 6, wherein the electronic tag comprises a micro control unit (MCU), the MCU comprises a controller having a first pin and a second pin, the first pin is electrically connected to the first end of the antenna, and the second pin electrically connected to a second end of the antenna.

9. The electronic system of claim 8, wherein the MCU further comprises a third pin and a fourth pin electrically connected to an I²C bus.

10. The electronic system of claim 6, wherein the electronic tag comprises an identification integrated circuit chip having a first pin and a second pin, wherein the first pin is electrically connected to the first end of the antenna, and the second pin electrically connected to a second end of the antenna.

11. The electronic system of claim 6, wherein the antenna is a loop antenna.

12. The electronic system of claim 6, wherein the electronic tag is a radio frequency identification (RFID) tag.

13. The electronic system of claim 6, wherein the electronic tag is a near-field communication (NFC) device.

14. The electronic system of claim 6, wherein the electronic tag further comprises a micro control unit (MCU) having a memory and a first interface.

15. The electronic system of claim 14, wherein the electronic device comprises a controller and a second interface, wherein the controller accesses the memory via the first interface and the second interface.

16. The electronic system of claim 6, further comprising a housing having an inner side facing the printed circuit board, and the electronic tag is affixed on the inner side.

17. The electronic system of claim 6, wherein the printed circuit board does not includes an identification integrated circuit chip.

18. The electronic system of claim 6, wherein the identification integrated circuit chip is not electrically connected to the printed circuit board.

19. An electronic system, comprising:
a device having a housing; and
an electronic tag affixed on the housing, comprising:
a substrate having a first side and a second side, wherein the first side is opposite to the second side;
an antenna having a first portion and a second portion, wherein the first portion is disposed on the first side, the second portion is disposed on the second side, and the first portion is electrically coupled to the second portion via plated through holes; and
an identification integrated circuit chip disposed on the first side, wherein the identification integrated circuit chip comprises a first pin and a second pin, the first pin is electrically connected to a first end of the antenna, and the second pin electrically connected to a second end of the antenna.

20. The electronic system of claim 19, wherein the identification integrated circuit chip further comprises a third pin and a fourth pin electrically connected to an I²C bus.

21. The electronic system of claim 19, wherein the first portion includes a substantially trapezoid conductor having a tapered end, the first end is electrically connected to the tapered end, and the plated through holes are disposed at one end opposite to the tapered end.

22. The electronic system of claim 21, wherein the second portion is substantially a rectangular conductor.

23. The electronic system of claim 19, further comprising a reflector disposed below the second side.

* * * * *